Sept. 25, 1962 W. J. ALBERSHEIM 3,056,129
SCANNING ANTENNA SYSTEM
Filed May 3, 1957 2 Sheets-Sheet 1

INVENTOR
W. J. ALBERSHEIM
BY R. B. Ardis
ATTORNEY

Sept. 25, 1962  W. J. ALBERSHEIM  3,056,129
SCANNING ANTENNA SYSTEM
Filed May 3, 1957  2 Sheets-Sheet 2

INVENTOR
W. J. ALBERSHEIM
BY  R. B. Ardis
ATTORNEY

United States Patent Office 3,056,129
Patented Sept. 25, 1962

3,056,129
SCANNING ANTENNA SYSTEM
Walter J. Albersheim, Madison, N.J., assignor to Bell Telephone Laboratories, Incorporated, New York, N.Y., a corporation of New York
Filed May 3, 1957, Ser. No. 656,987
7 Claims. (Cl. 343—11)

This invention relates to radar systems and, in particular, to radar systems utilizing a plurality of antennas having fan-shaped sensitivity patterns.

Inasmuch as an antenna sensitivity pattern is commonly referred to as a beam, these terms are used interchangeably in this specification. Furthermore, as used herein, a fan-shaped beam or fan beam is a beam which is narrow in one plane passing through the axis of the beam and broad in a second plane passing through the same axis and substantially perpendicular to the first plane.

In certain radar systems, such as ground operated antiaircraft fire control, an antenna system for rapidly scanning an extended solid angle is required for locating and tracking rapidly moving targets. One of the systems previously suggested for performing this function comprises two scanning antennas having mutually perpendicular fan-shaped beams for scanning a solid angle. The antennas may be operated individually from separate radar equipments at the same or different frequencies or, if desired, a single radar equipment may be used on a time sharing basis. These antennas may be arranged so that one beam sweeps in azimuth and the other beam sweeps in elevation. Inasmuch as the distance or range of a target is determined by the time necessary for transmitted energy to travel from the radar equipment to the target and back to the equipment, this system provides azimuth or bearing versus range and elevation versus range data which may be displayed on cathode ray screens. If many targets are present in the solid angle, range gating means may be used with this system to exclude the targets at ranges other than that of interest ("range gating means" in this sense are means which make the receivers in the equipment nonoperative at all times except for that interval when reflected energy from a target at a desired range is anticipated).

A problem arises in the above-described system when two or more targets occur at a particular range but at different azimuths and elevations. If two targets, for example, are present at the same range, it is possible for each of the beams to provide two pieces of information, i.e., two azimuth and two elevation indications. Inasmuch as this is the only information available, it is impossible to determine with certainty the proper correlation of the azimuth and elevation indications and, consequently, four combinations are possible to give four target locations. Expressed in a more general form, for $n$ targets at the same range, it is possible to have $n^2$ combinations of azimuth and elevation indications.

In U.S. Patent 2,514,617, issued to W. J. Albersheim, a system is disclosed in which two antennas having fan-shaped sensitivity patterns are utilized to scan a solid angle in a manner whereby the possibility of ambiguous target locations of the above-described type are eliminated. Although this system eliminates ambiguities, it is necessary to perform a number of operational steps which consume time. This may be a serious limitation in applications where time is of the essence.

An object of this invention is to locate more rapidly than heretofore possible two or more targets at the same range.

Another and more particular object is to avoid false target indications in a radar system when two or more targets are present at the same range.

The present invention inherently eliminates the erroneous target locations and thereby avoids the necessity of expending time for performing the operational steps necessary in the system disclosed in the above-mentioned patent to Albersheim.

In one of its broad aspects, the invention comprises means for measuring with respect to separate references three angular displacements for each target at a predetermined range and computing means for both correlating the angular displacements for each target and producing the target locations from the correlated angular displacements.

A feature of this invention is an antenna arrangement having at least three antennas that may be used with radar transceiver equipment for sweeping a common angle to register at least three target angular displacements for each target detected. Computing means, the design of which is based on the loci of the fan-shaped beams, may be used for performing the steps of correlating the angular displacements of the antennas for each of the targets and producing target bearing and elevation angles from the correlated angular displacements.

In a preferred embodiment, gated radar means is provided in which three fan-shaped beam producing antennas are mounted so that the beam produced by one of the antennas is horizontal in nature and sweeps in elevation while the other antennas produce azimuth or bearing sweeping beams which are tilted to either side of the vertical by an even amount and scan the same solid angle scanned by the first beam. Each time one of the beams detects a target, a target indication is produced at the output of the radar means. These indications are coupled, along with antenna position data, to a computer unit which generates target elevation and bearing angle indications.

Other objects and features of the invention will become apparent from a study of the following detailed description of a specific embodiment. In the drawings.

Figure 1:
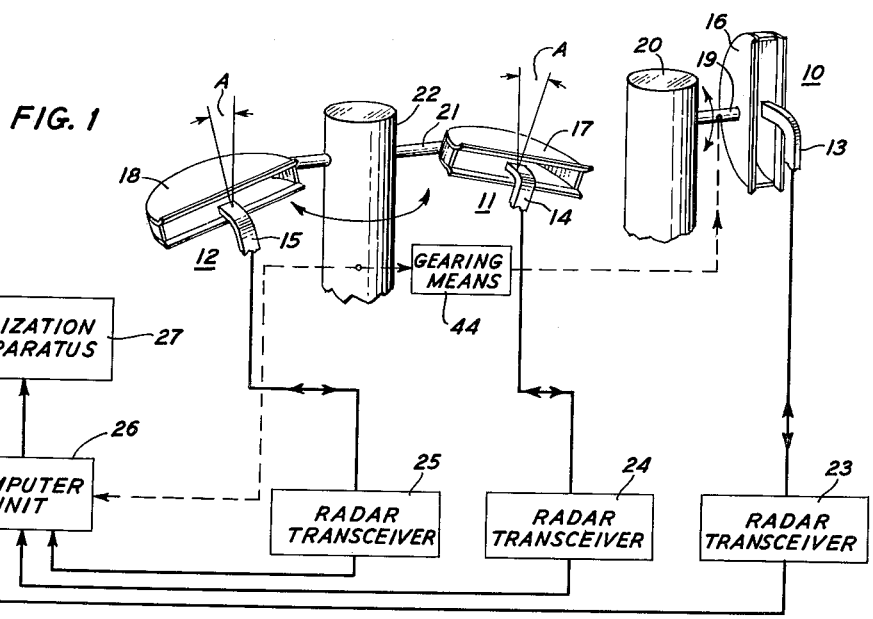
FIG. 1 shows a system illustrating one embodiment of the invention.

In FIG. 1, three fan-shaped beam producing antennas 10, 11, and 12 are shown comprising rectangular wave guide feedhorns 13, 14, and 15, and pill-box-shaped reflectors 16, 17, and 18. The antenna 10 is affixed to a horizontal member 19 which is connected to a support 20 so that member 19 may be rotated to cause antenna 10 to sweep in elevation. The antennas 11 and 12 are mounted on a horizontal member 21 in positions to be explained more fully in conjunction with FIG. 2. The horizontal member 21 is affixed to a vertical support 22 which is mounted so that it may be rotated about its axis. The member 19 is mechanically connected to support 22 by a gearing means 44. The antennas 10, 11, and 12 are connected to conventional gated radar transceivers 23, 24, and 25, respectively, which may operate on different frequencies or on the same frequency in a sequential fashion. If desired, the radar transceivers 23, 24, and 25 may be replaced by a gated time-sharing radar transceiver which is common to all three antennas. (A gated radar transceiver is one in which the receiver is inoperative at all times except for that interval when reflected energy from a target at a desired range is anticipated. Such apparatus and techniques are well-known in the radar art.) Each of the radar transceivers 23, 24, and 25 produces an indication in its output when a target at a gated range appears in the beam of its antenna. The outputs of the radar transceivers 23, 24, and 25 are electrically connected to a computer unit 26 which also receives, by mechanical connections, the rotational position of support 22 (and the synchronized position of member 19 through gearing means 44). The computer unit 26 is arranged to produce simultaneously the elevation and azimuth or bearing angles of a target, which are coupled into a utilization apparatus 27. The utilization apparatus 27 may comprise an oscilloscope display means or means for directing a gun at the target.

Figure 2:
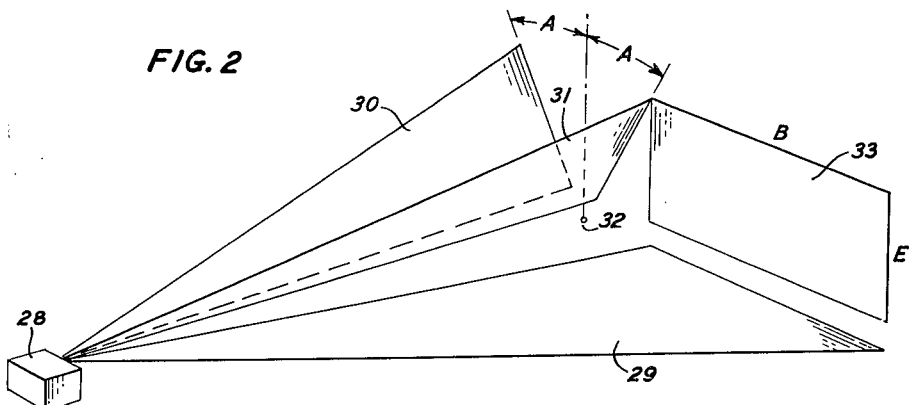
FIG. 2 shows a radar station in which the system of FIG. 1 may be housed and three fan-shaped beams produced by the system for sweeping an illustrated target area.

Radar station 28, shown in FIG. 2, houses the embodiment of the invention shown in FIG. 1. The horizontally positioned antenna 10 produces a horizontal beam 29 while the tilted antennas 11 and 12 produce tilted beams 30 and 31, respectively. The antennas 11 and 12 may be adjusted so that beams 30 and 31 converge in a line passing through a point 32. The rectangle 33 represents the target area at a particular range which is to be swept by beams 29, 30, and 31. This area is defined by the elevation angle E and the bearing angle B. The angles E and B have a common vertex at station 28.

Figure 3:
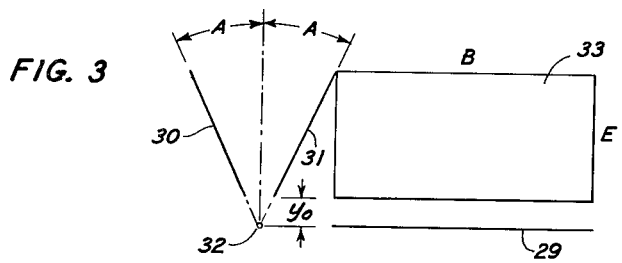
FIG. 3 is an elevation view of the target area shown in FIG. 2 and the intercepts of the beams on that target area.

In FIG. 3, the target area 33 has been redrawn and the cross sections of beams 29, 30, and 31 that intersect this area have been illustrated. The symbol $y_0$ is the angle of elevation of the lower ends of the beams 30 and 31, shown in FIG. 3, above the point 32. From this illustration, the following equations may be derived:

$$P_1 = x - y \tan A + E \tan A \quad (1)$$
$$P_2 = x + y \tan A + (E + 2y_0) \tan A \quad (2)$$
$$P_3 = (y + y_0) \tan A \quad (3)$$

where $x$ is the bearing angle of a target,
$y$ is the elevation angle of the same target,
$y_0$ is the elevation angle of the lowest point of each of the beams 30 and 31 above the point 32 where beams 29, 30, and 31 extended would intersect,
$A$ is the angle of tilt from the vertical of the beams 30 and 31 of antennas 11 and 12,
$P_1$, $P_2$ are the angular positions of support 22 when the beams 31 and 30, respectively, intersect the point $x$, $y$, and
$P_3$ is the angular position of support 22 (which is connected to the member 19 by the gearing means 44) when the beam 29 intersects the point $x$, $y$.

The angular positions $P_1$, $P_2$ and $P_3$ are measured from the position of support 22 when the beam 31 intersects the upper left-hand corner of rectangle 33. Solving Equations 1 and 2 to eliminate the $x$ terms produces the following equation:

$$y = 0.5(P_2 - P_1) \cot A - y_0 \quad (4)$$

From Equation 3, $$y = P_3 \cot A - y_0 \quad (5)$$

From Equations 4 and 5, the following triple coincidence equation follows:

$$P_1 - P_2 + 2P_3 = 0 \quad (6)$$

The significance of the support 22 angular relationship expressed by Equation 6 may be appreciated when two or more targets occur at a particular range but at different azimuths and elevations, and other means for correlating the antenna bearing angles are not available. Under these conditions, it is possible to obtain $n^3$ combinations of antenna bearing and elevation angles (where $n$ is the number of targets), only $n$ of which are correct. By substituting antenna bearing and elevation angles into Equation 6, it is possible to determine which of the combinations are the correct ones. Once the proper combinations of antenna bearing and elevation angles have been ascertained, it is possible to utilize the first three equations to determine the bearing and elevation angles of each of the targets. The computer unit 26 performs these operations.

Figure 4:
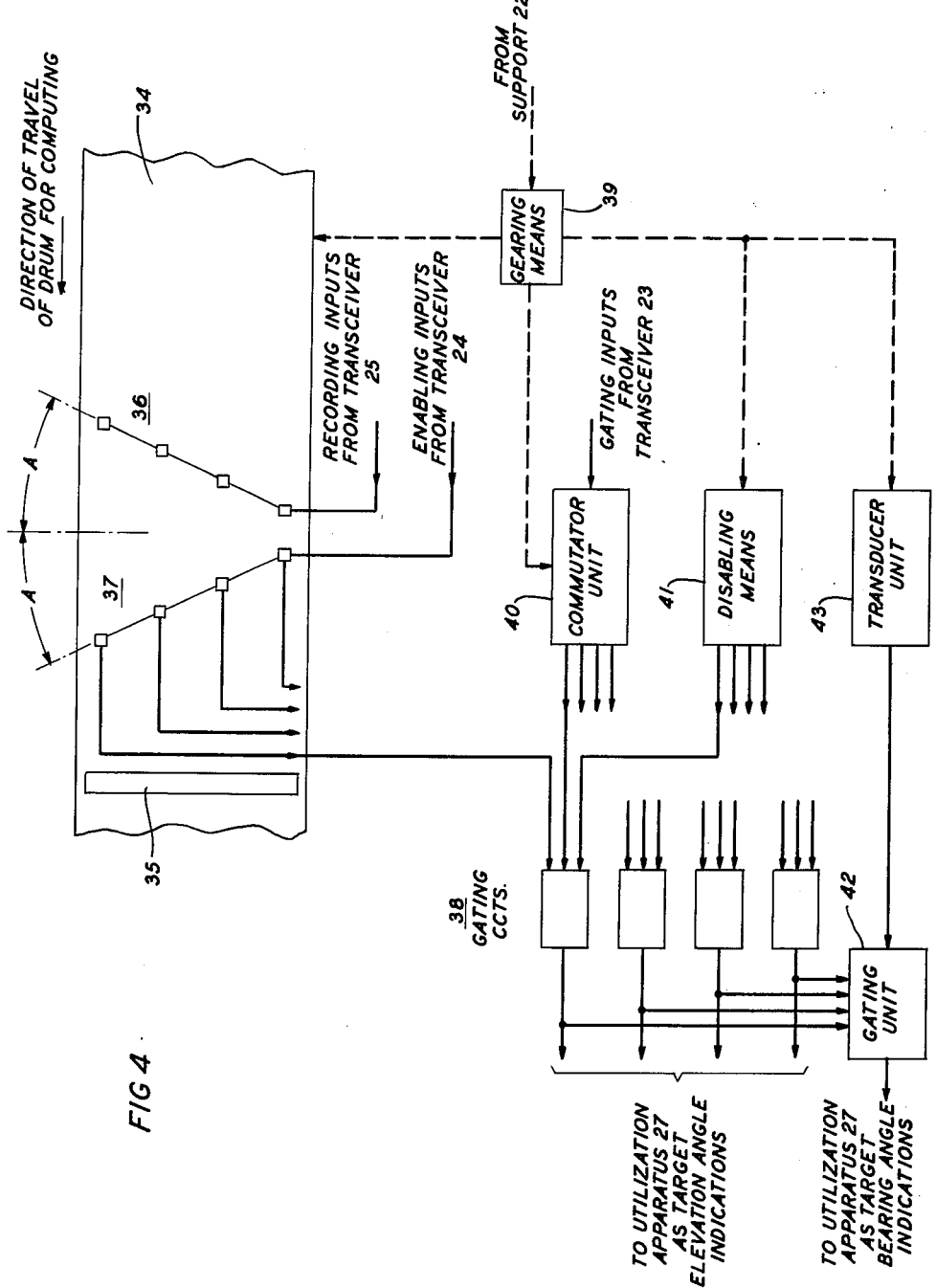
FIG. 4 illustrates one type of computer that may be used in the system shown in FIG. 1.

One computer arrangement that may be used in the embodiment of the invention as illustrated in FIG. 1 is shown in FIG. 4. In this this arrangement target elevation and bearing angles are produced in a quantized form. Basically, the computer comprises a cylindrically shaped magnetic drum 34 which is shown "unrolled" as a rectangle, an erasing head 35, a group of recording heads 36, a group of pick-up heads 37, and a group of gating circuits 38. The drum 34 may be geared by gearing means 39 to the support 22 of FIG. 1 in a manner whereby one complete revolution of the drum, minus the angle necessary for erasure, corresponds to the maximum bearing angle through which antennas 11 and 12 sweep. The erasing head 35, the recording heads 36, and the pick-up heads 37 are stationary and are arranged in lines tilted by the angle A to either side of a line perpendicular to the line of travel of drum 34. The recording heads 36 receive recording input signals from transceiver 25 while the pick-up heads 37 receive enabling input signals from transceiver 24.

In horizontal alignment with each pick-up head 37 is a recording head 36. Each one of the pick-up heads 37 has its output connected to a respective one of the gating circuits 38. (To simplify the drawings, only one connection has been shown.) Each one of the pick-up heads 37, the recording head 36 in alignment with it and the gating circuit 38 connected to that pick-up head comprise a quantizing channel in the computer. (To simplify the drawings, only four quantizing channels have been shown.) Also connected to each of the gating circuits 38 is a commutator unit 40 which is connected to gearing means 39 and transceiver 23. The commutator unit 40 connects transceiver 23 to the gating circuit 38 corresponding to the elevational position of antenna 10. A disabling means 41 is also connected to each of the gating circuits 38 in order to disable the gating circuits 38 at the end of each scanning cycle. This will be further explained in the discussion relating to the operation of the computer. The gating circuits 38 produce quantized elevation angle output signals which are coupled to both the utilization apparatus 27 and a gating unit 42. An output signal from any one of the gating circuits 38 closes gating unit 42. A transducer unit 43 is connected to gearing means 39 to produce an electrical signal corresponding to the angular position of drum 34. The output of transducer unit 43 is connected to gating unit 42.

For reasons which should become apparent from the following discussion with respect to the operation of the computer, it is necessary for beam 29 produced by the embodiment of the invention shown in FIG. 1 to sweep a target before beam 30 sweeps the same target. This may be accomplished through the gearing means 44 shown in FIG. 1.

Referring to all of the drawings, when the beam 31 sweeps a target at the desired range, the transceiver 25 produces a signal which energizes recording heads 36 to produce a series of magnetized spots on drum 34. As stated in the previous paragraph, the beam 29 sweeps the same target before the beam 30 sweeps it. This causes the transceiver 23 to produce a signal which is coupled to the proper gating circuit 38 by commutator unit 40. The signals from transceiver 23 enable gating circuit 38 to which it is coupled and this gating circuit remains enabled until disabled at the end of the sweeping cycle by the disabling means 41. As the beam 30 advances, the enabling inputs of the heads 37 are energized when the target is swept. When the beam 30 sweeps the target, the pick-up head 37 corresponding to the quantized elevation angle of the target has one of the magnetized spots produced by the heads 36 under it. An output signal is produced by that pick-up head, which is coupled to its associated gating circuit 38. Because the beam 29 has already swept the target, this gating circuit is enabled and an output signal is coupled to utilization apparatus 27 as a quantized elevation angle. It is also coupled to gating unit 42 which passes the output of the transducer unit 42 to utilization apparatus 27 as the target bearing angle.

If two or more targets are present at the same range, the groups of recording heads 36 produce additional series of magnetized spots on drum 34. During each revolution of drum 34 a number of output signals are produced by the pick-up heads equal to the number of targets. If the targets are at different elevation angles, no more than one quantized elevation angle indication is produced by any one of pick-up heads 37 during any one revolution of drum 34. If several targets are at the same elevation angle, then a number of quantized elevation angles are produced by one of the pick-up heads 37 during one revolution of drum 34. This does not present a problem as each target has its bearing angle indication produced simultaneously with its quantized elevation angle which definitely locates that target.

The erasing head 35 erases the magnetized spots on the drum 34 after they have passed under the pick-up heads 38. By this means, the information recorded on the drum 34 is changed once every revolution of the drum 34.

Although a preferred embodiment of the invention has been shown and discussed, the invention is not limited to that embodiment. In general, the invention relates to gated radar systems having a plurality of fan-beamed antennas for sweeping a common solid angle and computing means, the design of which is based on the loci of the beams of the antennas, for performing the steps of correlating the bearing and/or elevation angles of the antennas for each of the targets and producing target bearing and elevation angles therefrom.

In the disclosed embodiment, the antennas have been moved in order to cause their respective beams to scan the solid angle. It is to be understood that the invention is not limited to this type of antenna as the invention contemplates the use of any antenna capable of scanning with a fan-shaped beam.

Although a preferred embodiment of the invention has been described in detail, it is to be understood that various other embodiments may be devised by those skilled in the art without departing from the spirit and scope of the invention.

What is claimed is:

1. In a system for locating a plurality of targets at a given range, first means for establishing at least three angular references and measuring with respect to said refernces the angular displacements for each of said targets, and computing means for receiving the angular displacement measurements from said first means and producing therefrom indications of the coordinates of each of said targets.

2. In a system for locating a plurality of targets at a given range, first means for establishing at least three angular references and measuring with respect to said references the angular displacements for each of said targets, and computing means for receiving the angular displacement measurements from said first means and producing therefrom indications of target bearing and elevation angles.

3. In a system for locating a plurality of targets at a given range, pulse echo means for establishing at least three angular references and measuring with respect to said references angular displacements for each of said targets comprising at least three antennas having fan-shaped beams for scanning in a noncoincident manner a common solid angle and gated radar transceiver means connected to said antennas, and computing means for receiving the angular displacement measurements from said pulse echo means and producing therefrom indications of target bearing and elevation angles.

4. A system for locating a plurality of targets at a given range comprising at least three antennas for producing fan-shaped beams, control means for said antennas to angularly displace said beams with respect to separate angular references so that said beams scan in a non-coincident manner a common solid angle, gated radar transceiver means connected to said antennas for producing signal responses when said beams scan each of said targets, and computing means connected to said transceiver means and said control means for receiving both said responses and the displacement angles of said beams and producing therefrom indications of the angular positions of each of said targets.

5. A system for locating a plurality of targets at a given range comprising three fan-beamed antennas for producing a first beam, a second beam the plane of which is tilted with respect to the plane of said first beam and a third beam the plane of which is tilted with respect to both said first beam and second beam planes, control means to angularly displace said beams with respect to separate angular references so that said beams scan a common solid angle, gated radar transceiver means connected to said antennas for producing signal responses when said beams scan each of said targets, and computing means connected to said transceiver means and said control means for receiving said responses and the displacement angles of said beams and producing therefrom indications of the coordinates of said targets.

6. A system in accordance with claim 5 in which said plane of said first beam is substantially horizontal in nature.

7. A system for locating a plurality of targets at a given range comprising three fan-beamed antennas for producing a first beam the plane of which is substantially horizontal, a second beam the plane of which is tilted with respect to the vertical and a third beam the plane of which is tilted with respect to the vertical in a direction opposite to the said plane of said second beam, control means to angularly displace said beams with respect to separate angular references so that said beams scan a common solid angle, gated radar transceiver means connected to said antennas for producing signal responses when said beams scan each of said targets, and computing means connected to said transceiver means and said control means for receiving both said responses and the displacement angles of said beams and producing therefrom indications of the coordinates of each of said targets.

References Cited in the file of this patent
UNITED STATES PATENTS

| | | |
|---|---|---|
| 2,703,880 | Longacre | Mar. 8, 1955 |
| 2,803,819 | Blair | Aug. 20, 1957 |